United States Patent
Kaushikkar et al.

(10) Patent No.: US 9,454,482 B2
(45) Date of Patent: Sep. 27, 2016

(54) DUPLICATE TAG STRUCTURE EMPLOYING SINGLE-PORT TAG RAM AND DUAL-PORT STATE RAM

(71) Applicant: Apple Inc., Cupertino, CA (US)

(72) Inventors: Harshavardhan Kaushikkar, San Jose, CA (US); Muditha Kanchana, San Jose, CA (US); Odutola O. Ewedemi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 363 days.

(21) Appl. No.: 13/928,636

(22) Filed: Jun. 27, 2013

(65) Prior Publication Data

US 2015/0006803 A1    Jan. 1, 2015

(51) Int. Cl.
*G06F 12/00* (2006.01)
*G06F 12/08* (2016.01)

(52) U.S. Cl.
CPC .................. *G06F 12/0815* (2013.01)

(58) Field of Classification Search
CPC .................. G06F 12/0866–12/0873
USPC .................. 711/141–146
See application file for complete search history.

(56) References Cited

U.S. PATENT DOCUMENTS

| | | | | |
|---|---|---|---|---|
| 5,228,135 A | * | 7/1993 | Ikumi | 711/131 |
| 5,339,322 A | * | 8/1994 | Rastegar | 714/805 |
| 5,513,335 A | * | 4/1996 | McClure | 711/130 |
| 5,581,729 A | * | 12/1996 | Nishtala et al. | 711/143 |
| 6,076,147 A | * | 6/2000 | Lynch et al. | 711/146 |
| 6,292,705 B1 | * | 9/2001 | Wang et al. | 700/5 |
| 8,271,997 B2 | | 9/2012 | Frank et al. | |
| 8,352,689 B2 | | 1/2013 | Noeldner et al. | |
| 8,370,557 B2 | | 2/2013 | Dama et al. | |
| 8,392,658 B2 | * | 3/2013 | Wang et al. | 711/128 |
| 2003/0204682 A1 | * | 10/2003 | Ueno | G06F 12/08 711/147 |
| 2010/0161892 A1 | * | 6/2010 | Dama et al. | 711/104 |
| 2011/0264853 A1 | * | 10/2011 | Tanaka | G11C 7/1075 711/104 |

* cited by examiner

*Primary Examiner* — Midys Rojas
*Assistant Examiner* — Tasnima Matin
(74) *Attorney, Agent, or Firm* — Meyertons, Hood, Kivlin, Kowert & Goetzel, P.C.

(57) ABSTRACT

An apparatus for processing cache requests in a computing system is disclosed. The apparatus may include a single-port memory, a dual-port memory, and a control circuit. The single-port memory may be store tag information associated with a cache memory, and the dual-port memory may be configured to store state information associated with the cache memory. The control circuit may be configured to receive a request which includes a tag address, access the tag and state information stored in the single-port memory and the dual-port memory, respectively, dependent upon the received tag address. A determination of if the data associated with the received tag address is contained in the cache memory may be made the control circuit, and the control circuit may update and store state information in the dual-port memory responsive to the determination.

19 Claims, 7 Drawing Sheets

DUPLICATE TAG STRUCTURE EMPLOYING SINGLE-PORT TAG RAM AND DUAL-PORT STATE RAM

BACKGROUND

1. Technical Field

This invention relates to computing systems, and more particularly, maintaining coherency among multiple cache memories.

2. Description of the Related Art

Computing systems may include one or more systems-on-a-chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

To implement the desired functions on an SoC, one or more processors may be employed. Each processor may include a memory system with multiple levels of caches for providing low latency access to program instructions and operands. With multiple processors accessing multiple caches as well as main memory, the issue of cache coherency may arise. For example, a given data producer, such as, e.g., one of processors, may write a copy of data in a cache, but the update to main memory's copy of the data may be delayed. In write-through caches, a write operation may be dispatched to memory in response to the write to the cache line, but the write is delayed in time. In a writeback cache, writes are made in the cache and not reflected in memory until the updated cache block is replaced in the cache (and is written back to main memory in response to the replacement).

Because the updates have not been made to main memory at the time the updates are made in cache, a given data consumer, such as, e.g., another processor, may read the copy of data in main memory and obtain "stale" data (data that has not yet been updated). A cached copy in a cache other than the one to which a data producer is coupled can also have stale data. Additionally, if multiple data producers are writing the same memory locations, different data consumers could observe the writes in different orders.

Cache coherence solves these problems by ensuring that various copies of the same data (from the same memory location) can be maintained while avoiding "stale data", and by establishing a "global" order of reads/writes to the memory locations by different producers/consumers. If a read follows a write in the global order, the data read reflects the write. Typically, caches will track a state of their copies according to the coherence scheme. For example, the popular Modified, Exclusive, Shared, Invalid (MESI) scheme includes a modified state (the copy is modified with respect to main memory and other copies); an exclusive state (the copy is the only copy other than main memory); a shared state (there may be one or more other copies besides the main memory copy); and the invalid state (the copy is not valid). The MOESI scheme adds an Owned state in which the cache is responsible for providing the data for a request (either by writing back to main memory before the data is provided to the requestor, or by directly providing the data to the requester), but there may be other copies in other caches. Maintaining cache coherency is increasingly challenging as various different types of memory requests referencing uncacheable and cacheable regions of the address space are processed by the processor(s).

SUMMARY OF THE EMBODIMENTS

Various embodiments for a circuit and method for processing a cache request are disclosed. Broadly speaking, an apparatus and method are contemplated in which a single-port memory is configured to store tag information associated with a cache memory, and a dual-port memory is configured to store state information for the cache memory. A control circuit may be configured to receive a tag address, and access the single-port and dual port memories using the received tag address. The control circuit may be further configured to determine if data associated with the tag address is contained in the cache memory, update and store state information in response to the determination.

In one embodiment, the control circuit may be further configured to store new tag information into the single-port memory. In a further embodiments, the single-port memory may be configured to store one or more parity bits.

In a particular embodiment, the single-port memory may be implemented as a static random access memory (SRAM). In an alternative embodiment, the dual-port memory may be similarly implemented as a SRAM.

BRIEF DESCRIPTION OF THE DRAWINGS

The following detailed description makes reference to the accompanying drawings, which are now briefly described.

Figure 1:
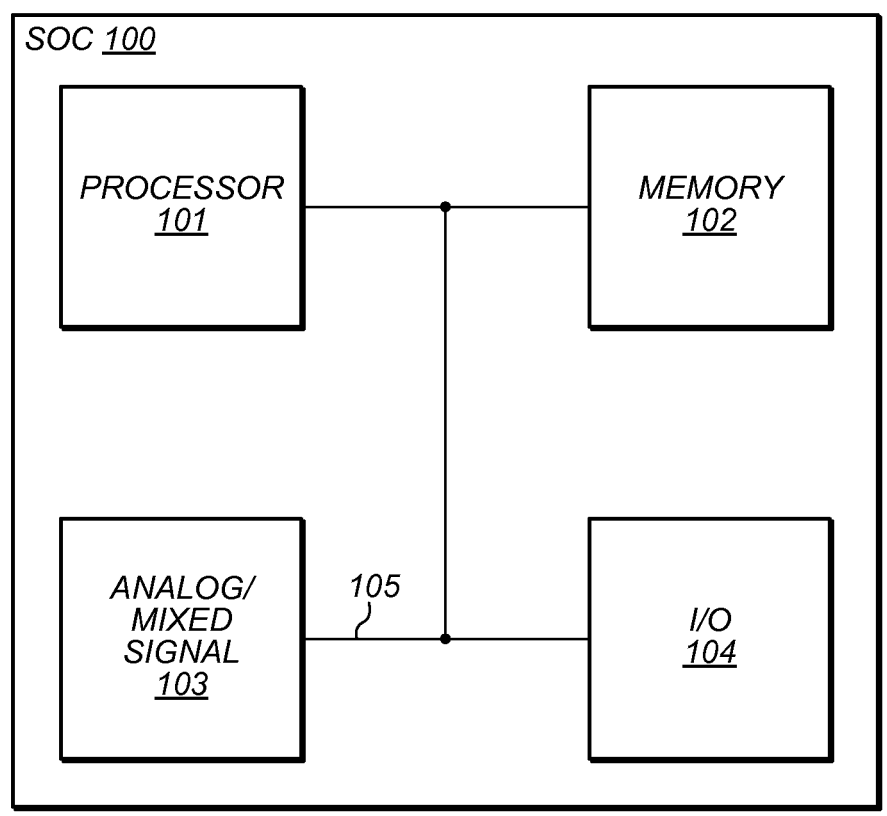
FIG. 1 illustrates an embodiment of a system on a chip.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

To improve computational performance, a system-on-a-chip (SoC) may include multiple processors. Each processor may employ a local cache memory to provide rapid access to local copies of instructions and operands. In some cases, there may be multiple copies of an operand. For example, there may a copy of an operand in main memory in addition to a copy in each cache memory employed. When one of the copies of the operand is changed, the other copies must be updated as well. Maintaining consistency of data across the various memories is commonly referred to as maintaining "cache coherence."

To maintain coherence between main memory and various cache memories, requests may be sent to processors or other functional blocks within the SoC to perform certain tasks or provide certain data. The requests may need to be handled in a specific order to prevent the use of invalid cache data. The embodiments illustrated in the drawings and described below may provide techniques for determining if data requested by a functional block or processor is contained with the cache memory of another functional block or processor, while allowing for a single pass through a tag processing pipeline, thereby eliminating the need for a dual-port tag memory.

System-on-a-Chip Overview

A block diagram of an SoC is illustrated in FIG. 1. In the illustrated embodiment, SoC 100 includes a processor 101 coupled to memory block 102, and analog/mixed-signal block 103, and I/O block 104 through internal bus 105. In various embodiments, SoC 100 may be configured for use in a mobile computing application such as, e.g., a tablet computer or cellular telephone. Transactions on internal bus 105 may be encoded according to one of various communication protocols. For example, transactions may be encoded using Peripheral Component Interconnect Express (PCIe®), or any other suitable communication protocol.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), a FLASH memory, Phase Change Memory (PCM), or a Ferroelectric Random Access Memory (FeRAM), for example. It is noted that in the embodiment of an SoC illustrated in FIG. 1, a single memory block is depicted. In other embodiments, any suitable number of memory blocks may be employed.

As described in more detail below, processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA).

Analog/mixed-signal block 103 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 103 may be configured to perform power management tasks with the inclusion of on-chip power supplies and voltage regulators. Analog/mixed-signal block 103 may also include, in some embodiments, radio frequency (RF) circuits that may be configured for operation with cellular telephone networks.

I/O block 104 may be configured to coordinate data transfer between SoC 101 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 104 may be configured to implement a version of Universal Serial Bus (USB) protocol or IEEE 1394 (Firewire®) protocol.

I/O block 104 may also be configured to coordinate data transfer between SoC 101 and one or more devices (e.g., other computer systems or SoCs) coupled to SoC 101 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

Each of the functional blocks included in SoC 100 may be included in separate power and/or clock domains. In some embodiments, a functional block may be further divided into smaller power and/or clock domains. Each power and/or clock domain may, in some embodiments, be separately controlled thereby selectively deactivating (either by stopping a clock signal or disconnecting the power) individual functional blocks or portions thereof.

Figure 2:
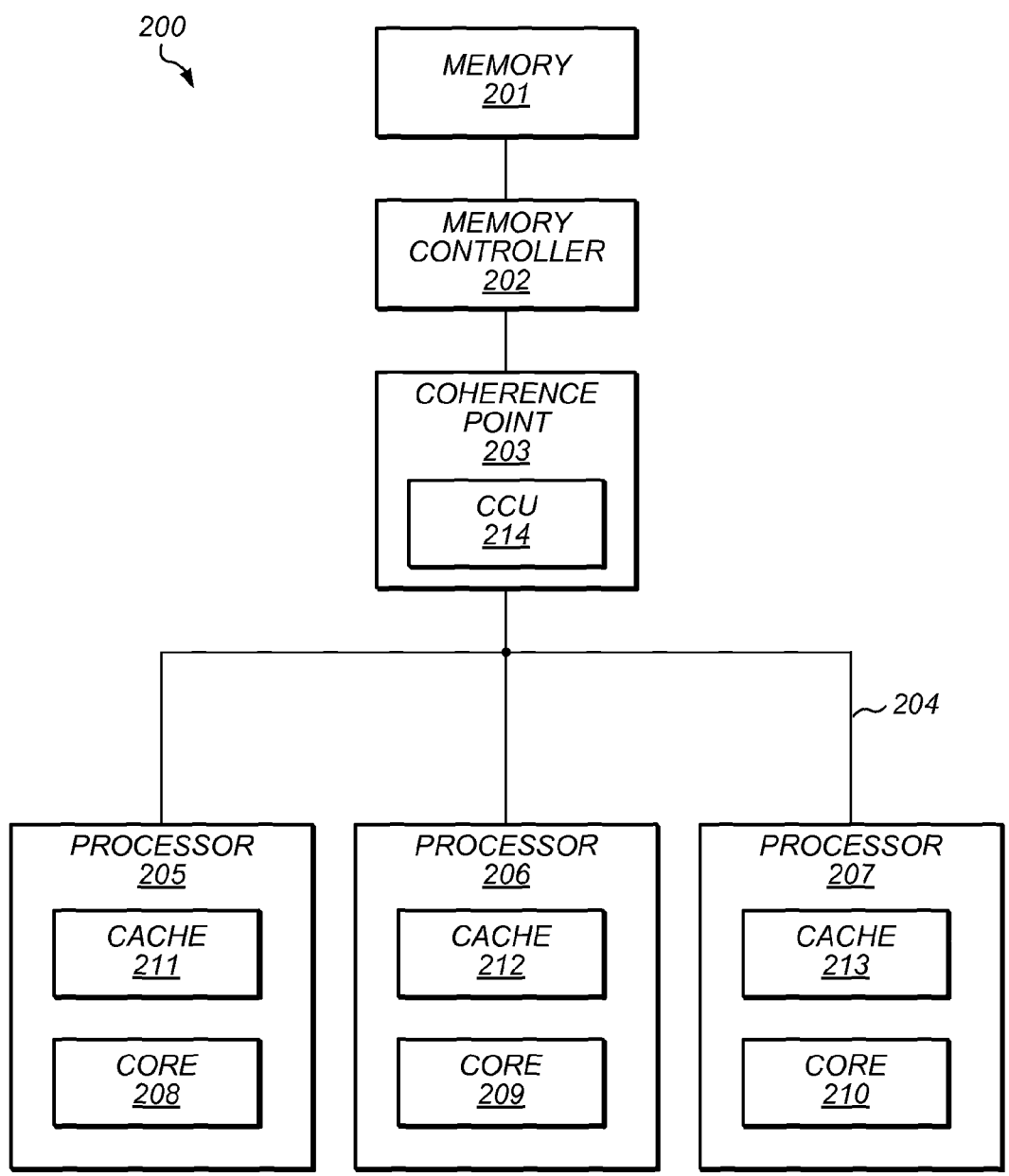
FIG. 2 illustrates another embodiment of a system on a chip.

Turning to FIG. 2, another embodiment of an SoC is depicted. In the illustrated embodiment, SoC 200 includes a memory 201, a memory controller 202, a coherence point circuit 203, and processors 205, 206, and 207. Processor 205 includes processor core 208 and cache memory 211. Similarly, processor 206 includes processor core 209 and cache memory 212, and processor 207 includes processor core 210 and cache memory 213.

Each of processors 208, 209, and 210 are coupled to coherence point circuit 203 through bus 204. It is noted that although only three processors are depicted, in other embodiments, different numbers of processors as well as other functional blocks (also referred to herein as "agents") may be coupled to bus 204. In some embodiments, bus 204 may correspond to bus 105 of SoC 100 as illustrated in FIG. 1. Bus 204 may be encoded in one of various communication protocols that may support the transmission of coherence requests and responses between processors 208, 209, and 210, and coherence point circuit 203.

Memory 201 may, in some embodiments, include one or more DRAMs, or other suitable memory device. Memory 201 is coupled to memory controller 202 which may be configured to generate control signals necessary to perform read and write operations to memory 201. In some embodiments, memory controller 202 may implement one of various communication protocols, such as, e.g., a synchronous double data rate (DDR) interface.

In some embodiments, coherence point circuit 203 may include a coherence control unit (CCU) 214. CCU 214 may be configured to receive requests and responses (collectively referred to as "transactions") between processors 208, 209, and 210, and memory 201. Each received transaction may be evaluated in order to maintain coherency across cache memories 211, 212, and 213, and memory 201. CCU 214 may maintain coherency using one of various coherency protocols such as, e.g., Modified Share Invalid (MSI) protocol, Modified Owned Exclusive Shared Invalid (MOESI) protocol, or any other suitable coherency protocol. Although only one CCU is depicted in FIG. 2, in other embodiments, coherence point circuit 203 may include any suitable number of CCUs.

Cache memories 211, 212, and 213 may be designed in accordance with one of various design styles. For example, in some embodiments, cache memories 211, 212, and 213 may be fully associative, while in other embodiments, the memories may be direct-mapped. Each entry in the cache memories may include a "tag" (which may include a portion of the address of the actual data fetched from main memory). In some embodiments, coherence point circuit 203 may include a set of duplicate tags for the cache entries in each of cache memories 211, 212, and 213.

It is noted that embodiment of an SoC illustrated in FIG. 2 is merely an example. In other embodiments, different numbers of processors and other functional blocks may be employed.

Coherence Processing

Figure 3:
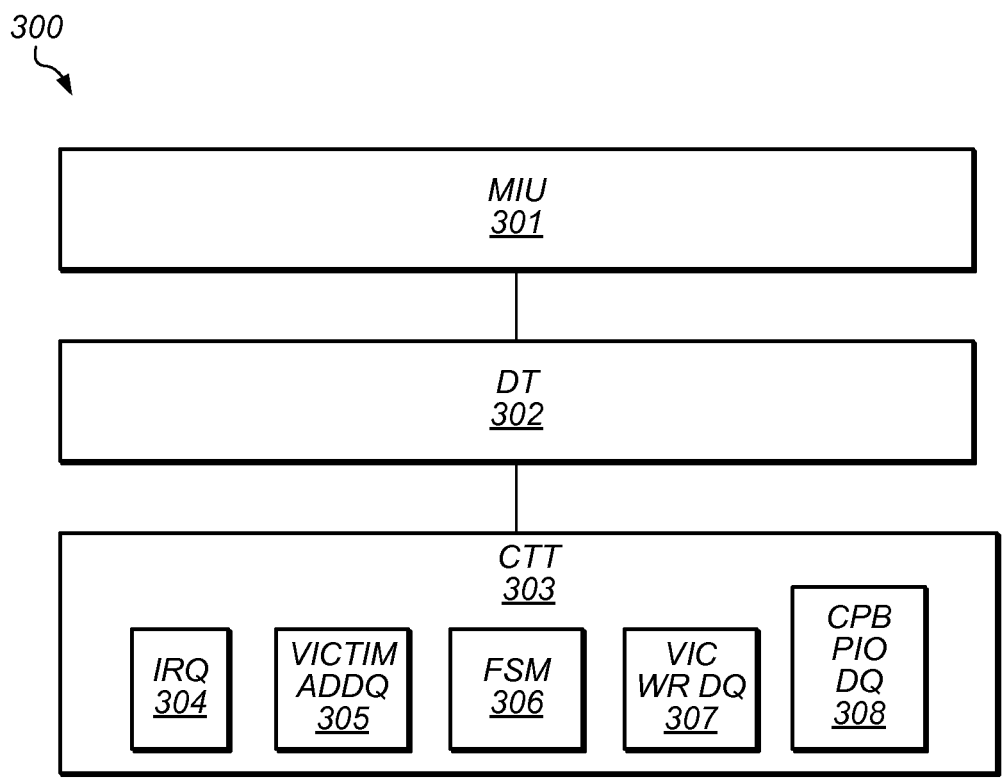
FIG. 3 illustrates an embodiment of a coherence control unit.

Turning to FIG. 3, an embodiment of a coherency control unit (CCU) is illustrated. CCU 300 may, in some embodiments, correspond to CCU 213 in coherence point circuit 203 of SoC 200 as illustrated in FIG. 2. In the illustrated embodiment, CCU 300 includes memory interface unit (MIU) 301, duplicate tag (DT) pipeline 302, and current transaction table (CTT) 303. MIU 301 interfaces to a memory controller (not shown), and is coupled to DT 302. CTT 303 interfaces to one or more agents (not shown) and is also coupled to DT 302.

MIU 301 may be configured to send read and write requests leaving CCU 300 to a memory controller, such a memory controller 202 as depicted in SoC 200 as illustrated in FIG. 2. In some embodiments, MIU 301 may send read and write requests to the memory controller from multiple sources, such as, e.g., speculative reads, writes from a victim write data queue, and writes from the copy back queue. MIU 301 may include an arbitration circuit, which selects between the various sources of read and write requests. In some embodiments, the arbitration circuit may perform a least recently granted (LRG) algorithm, or any other suitable arbitration algorithm.

DT 302 may be configured to store copies of cache tags (collectively referred to as "duplicate tags"), such as the tags from cache memories 211, 212, and 213 as illustrated in FIG. 2. Access to the duplicate tags may be controlled by a multi-stage pipeline. In some embodiments, incoming addresses may be compared with the duplicate tags to determine which, if any, agent's cache memories contain the cache block associated with the incoming address. When a match is found (commonly referred to as a "cache hit"), the transaction may require coherence processing, i.e., verifying that all copies of requested cache block have the same data. When no match is found (commonly referred to as a "cache miss"), the transaction associated with the incoming address may not require coherence processing, and any associated memory operations may be sent to a memory through MIU 301.

Duplicate tag structures, such as, e.g., DT 302, may be implemented according to various design styles. In some embodiments, both tag and state information may be stored in a single dual-port memory while, in other embodiments, tag information may be stored in a single-port memory and state information may be stored in a dual-port memory as described below in more detail. In cases where a tag and state information is stored in a common dual-port memory, logic circuits may be employed to avoid conflicts between the read and write ports of the dual-port memory.

In various embodiments, CTT 303 may include an incoming request queue (IRQ) 304, a victim address queue 305, a victim write data queue 307, a copy back peripheral input/output (PIO) response queue 308, and a coherence processing/snoop control (finite-state machine) FSM and scoreboard logic 306.

All incoming requests may be stored in IRQ 304. The requests may remain in IRQ 304 for varying durations dependent upon the time required to process the transaction. IRQ 304 may contain any suitable number of entries, and a credit-based control mechanism may be employed by CCU 300 to determine whether new requests may be added to the IRQ 304. In some embodiments, multiple flip-flops may be employed to implement each entry of IRQ 304. The number of flip-flops may, in other embodiments, correspond to the number of data bits within a data packet transmitted on a bus, such as, e.g., bus 204 as illustrated in FIG. 2.

In coming requests may be compared against existing entries in IRQ 304 in order to establish any dependencies. In some embodiments, requests stored in IRQ 304 may be sent to DT 302 for tag lookup.

Each received read request from an agent may contain the request address and way information necessary to identify which way the line will fill in the requesting agent's cache memory. In some cases, a cache line may already be at the location specified by the received request address and way information. Such a cache line is commonly referred to as a "victim line" and may need to be written back to memory (also referred to herein as being "evicted") before that location in the cache may be filled.

When a victim line is either in the modified or owned state in a cache memory, the cache line may be dirty, i.e., the line has been changed from its original state, and the requesting agent may be required to write the victim cache line back to memory. For the duration that CCU 300 is processing a transaction with a given victim address, no other transaction to the same address as the victim address may be allowed to proceed. To ensure that no other transactions proceed, dependency checking is performed. To allow for dependency checking, each incoming victim address may be stored in victim address queue 305. In some embodiments, there may be one entry in victim address queue 305 for each transaction entry in CTT 303. Victim address queue 305 may, in some embodiments, employ a flip-flops and a content-addressable memory (CAM) structure to facilitate dependency checking.

For each request that has an associated victim, CCU 300 may send a pull victim request to the requesting agent to retrieve the victim cache line. In response to the pull victim request, the agent responds with the cache line being evicted. The cache line may be stored in victim write data queue 307 until coherence processing FSM 306 arbitrates and writes the data to memory, such as memory 201 as illustrated in FIG. 2. In some embodiments, there may be one entry in victim write data queue 307 for each transaction entry in CTT 303.

Read requests that generate a hit within DT 302 may receive data from one or more of the cache memories. Such data is labeled as copy back data and may be stored in copy back PIO response queue 308, and write requests of copy back data may be initiated from copy back PIO response queue 308. In some embodiments, copy back PIO response queue 308 may be implement using dual-port static random access memories (SRAMs) or any other suitable memory circuit. In some embodiments, data returned from PIO transaction may be stored in copy back PIO response queue 308 before the data is forwarded onto the requesting agent.

Processing of coherence transactions may be controlled by coherence processing/snoop control FSM and scoreboard logic 306. The scoreboard logic may, in various embodiments, track requests and corresponding response to the requests from agents within an SoC, such as, e.g., SoC 200 as illustrated in FIG. 2. In some embodiments, one instance of coherence processing/snoop control FSM and scoreboard logic 306 may included per entry in CTT 303.

The FSM portion of coherence processing/snoop control FSM and scoreboard logic 306 may, in some embodiments, be implemented as a sequential logic circuit, i.e., a logic circuit whose next logical state is dependent on the current logical state in additional to present input, configured to transition through a pre-determined number of logical states. The sequential logic circuit may include one or more flip-flop circuits. Each flip-flop circuit may be implemented in accordance with any number of design styles, such as, e.g., dynamic or static circuit design styles.

The scoreboard may be implemented using one or more state registers. Each of the state registers may be set when a corresponding event occurs, or when a request is made by the coherence processing logic to either the memory or an agent. A state register may be reset when an expected event has occurred, or when a request that has been made progresses. In some embodiments, the logical state of the state registers may be combined to form a signal indicating that coherence processing for the transaction associate with the scoreboard has completed.

The scoreboard may be organized to manage multiple independent sets of operations or "flows" associated with a given transaction. For example, a read request that has a victim and encounters a hit in DT 302 may need to simultaneously utilize a flow of coherence handling and a flow for victim handling. One both flows have completed, the scoreboard may assert the signal indicating that coherence processing has completed, which may allow the FSM to relinquish the transaction entry in IRQ 304.

It is noted that the embodiment illustrated in FIG. 3 is merely an example. In other embodiments, different functional blocks and different configurations of functional blocks are possible and contemplated.

In some embodiments, a coherence request may require that data is read from a duplicate tag structure, modified in some fashion, and then re-written into the duplicate tag structure (commonly referred to as a "read-modify-write"). For example, during a write request, duplicate tags must be checked to determine if there is a match (or "hit"). If there is a hit, then the state of the matching cache entry may need to be modified to indicate the new owner of the cache entry. The updated state information may then need to be re-written to the appropriate entry in the duplicate tag structure. Such requests may reduce throughput in processing coherence requests given the read-modify-write nature of the processing.

Improvements may be achieved, in various embodiments, by separating the tag information from the state information. This may allow, in some embodiments, tag information to be stored in a larger single-port memory, while state information to be stored in a smaller dual-port memory. Additional overheard may be required, in various embodiments, to allow for the tag and state information to be stored separated. In some embodiments, any necessary processing required to store the tag and state information separately, may be performed by a dedicated logic circuit, while in other embodiments, a coherency protocol observed by all coherent agents within a computing system, may be implemented to avoid the need for the aforementioned read-modify-requests, thereby allowing separate storage of the tag and state information, and improving coherence request processing throughput.

Figure 4:
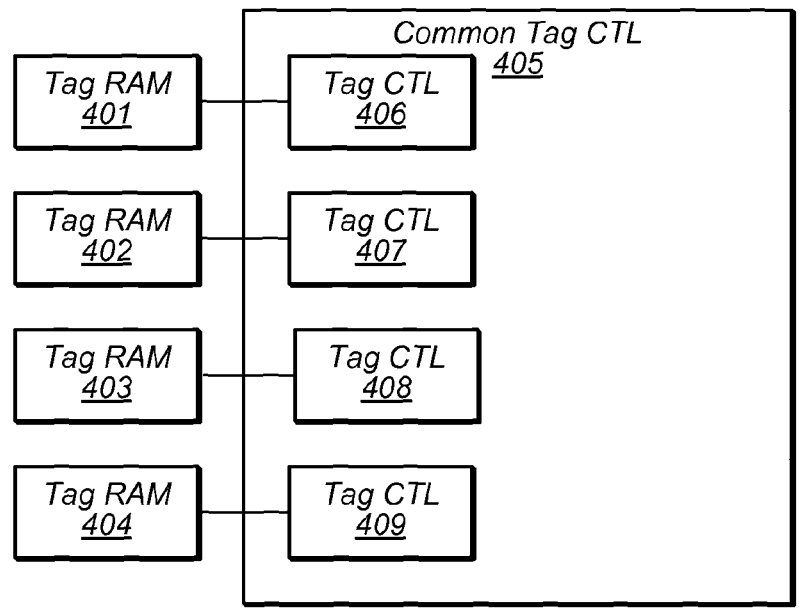
FIG. 4 illustrates an embodiment of a duplicate tag unit.
Figure 4:
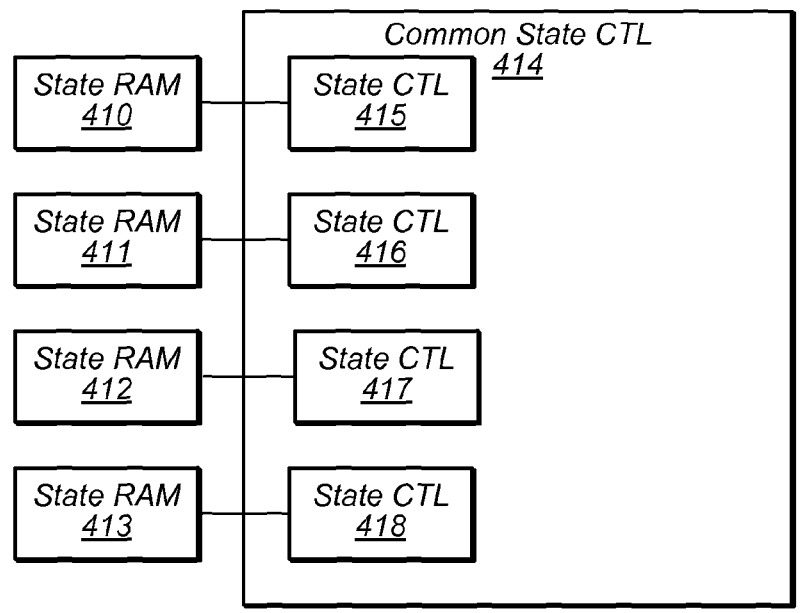

An embodiment of a duplicate tag unit that employs separate tag and state storage as described above is illustrated in FIG. 4. In some embodiments, duplicate tag unit 400 may correspond to duplicate tag 302 as illustrated in FIG. 3. In the illustrated embodiment, duplicate tag unit 400 includes tag random access memories (RAMs) 401 through 404, common tag control circuit 405, state RAMs 410 through 413, and common state control circuit 414. Common tag control circuit 405 includes tag control circuits 406 through 409, each of which is coupled to tag RAMs 401 through 404, respectively. Common state control circuit 414 includes state control circuits 415 through 418, each of which is coupled to state RAMs 410 through 413. In some embodiments, a coherency unit may include multiple duplicate tag units such as duplicate tag unit 400 as illustrated in FIG. 4.

Tag RAMs 401 through 404 may each be configured to store tag information for a corresponding cache memory. In some embodiments, there may be a tag RAM for each cache memory within an SoC such as, SoC 100 as illustrated in FIG. 1, for example. The contents of each tag RAM may be maintained in response to various coherency transactions handled coherency unit such as coherency point 300 as illustrated in FIG. 3, for example.

Each of tag RAMs 401 through 404 may, in some embodiments, be a single-port memory, i.e., each RAM includes a single input/output (I/O) port that may be used for both read and write accesses to the RAM. The tag RAMs may be implemented as static random access memories (SRAMs) or any other suitable memory technology.

Each of state RAMs 410 through 414 may be configured to store the coherency state of cache line entries contained in a cache memory. In some embodiments, each of state RAMs 410 may store information for a different cache memory included within an SoC such as, SoC 100 as illustrated in FIG. 1, for example.

State RAMs 410 through 414 may, in some embodiments, be implemented as dual-port memories. A dual-port memory may include multiple I/O ports, allowing simultaneous access to different address locations with the memory. In some embodiments, each port may be configured for differing access types. For example, one port may be configured for read accesses, while the other may be configured for write accesses. In other embodiments, each port may be configured to allow either a read or write access to the memory. Dual-port data storage cells may be employed, in some embodiments, to implement a dual-port memory. In other embodiments, single-port data storage cells may be employed and time-domain multiplexing may be employed to implement the dual-ports of the memory.

In some embodiments, each of tag RAMs 401 through 404 and state RAMs 410 through 413 may be configured to specific needs of the various coherent agents that have associated cache memories. In other embodiments, each of the aforementioned RAMs may be of identical configuration. Tag RAMs 401 through 404 may, in various embodiments, include multiple banks. In such cases, a pipeline circuit, such as pipeline circuit 600 as described below in more detail, may process more than one transaction per cycle. For example, a read operation may be performed to one bank of a tag RAM, while another read operation or a write operation may be simultaneously performed to another bank of the tag RAM.

Tag control circuits 406 through 409 may be configured to operate tag RAMs 401 through 404, respectively. In a similar fashion, state control circuits 415 through 418 may be configured to operate state RAMs 410 through 413, respectively. In some embodiments, by employing separate control circuits for each tag and state RAMs, an arbitrary number of coherent agents may be supported. Common tag control circuit 405 and common state control circuit 414 may also include circuitry (not shown) to combine data resulting from accessing the tag and state RAMs. To minimize computing effort when operating a duplicate tag unit, many of the operations may be performed in parallel across the various tag and state RAMs. For example, when processing a coherency request, duplicate tag unit 400 may simultaneously access each of tag RAMs 401 through 404 and process the results. The processed results may then be combined by common tag control circuit 405 to generate a response to the agent, which originated the coherency request.

In the embodiment illustrated in FIG. 4, four tag and state RAMs are depicted in duplicate tag unit 400. It is noted that, in other embodiments, different numbers of tag and state RAMs may be employed.

Figure 5:
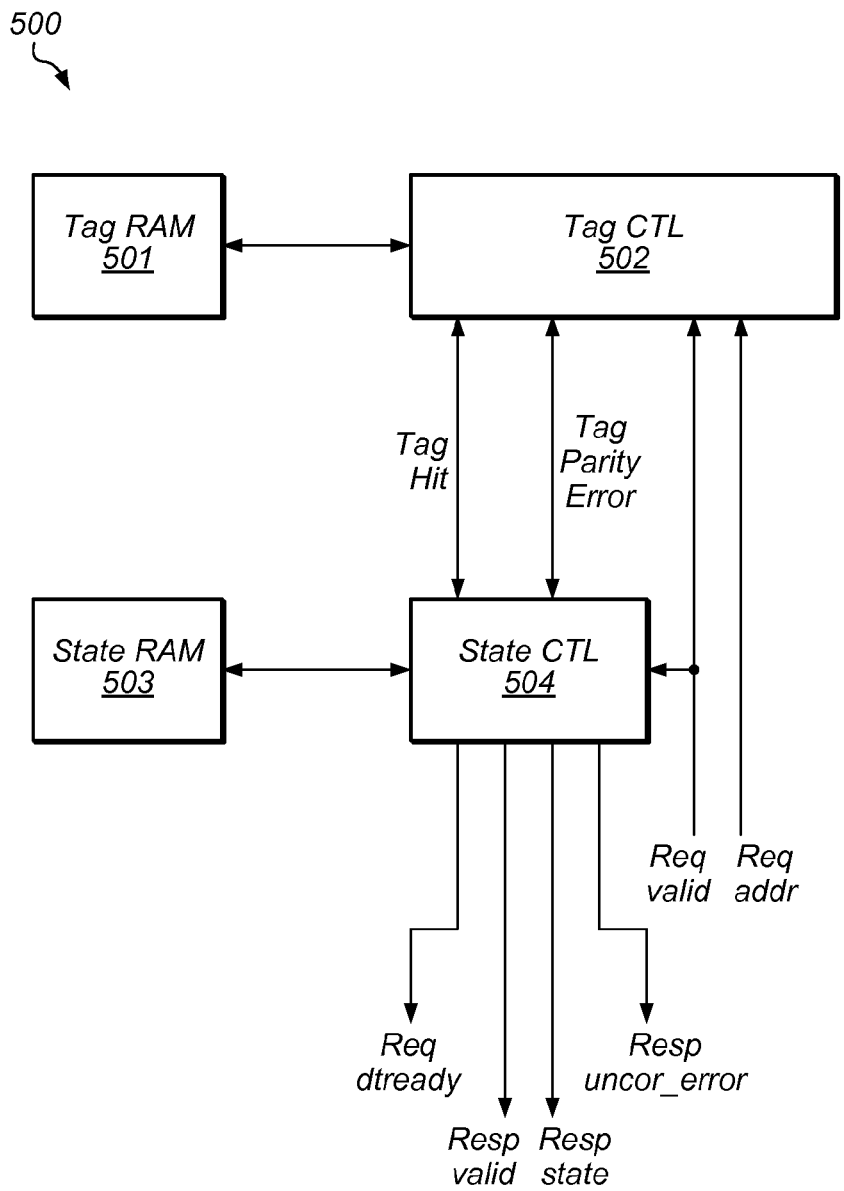
FIG. 5 illustrates another embodiment of a duplicate tag unit.

Turning to FIG. 5, another embodiment of a duplicate tag unit is illustrated. The illustrated embodiment may, in some embodiments, correspond to a portion of duplicate tag unit 400 as illustrated in FIG. 4. In the illustrated embodiment, duplicate tag unit 500 includes tag RAM 501, state RAM 503, tag control circuit 502, and state control circuit 504. In some embodiments, tag control circuit 502 may be configured to operate tag RAM 501, and state control circuit 504 may be configured to operate state RAM 501.

In some embodiments, tag RAM 501 may be configured to store tag information, and may be implemented as a single-port memory, and state RAM 503 may be configured to store coherency state information, and may be implemented as a dual-port memory. Tag RAM 501 may, in other embodiments, be configured to store parity information along with the tag information. Both tag RAM 501 and state RAM 503 may be implemented as static random access memories (SRAMs) or any other suitable memory type.

During operation, tag control circuit 502 may receive an address corresponding to a coherency operation received from a coherency agent by a coherence point such as coherence point 203 as illustrated in FIG. 2. Tag control circuit 502 may use the received address to access tag RAM 501. In some embodiments, tag control circuit 502 may perform error checking on data retrieved from tag RAM 501 using parity information stored in tag RAM 501. Tag control circuit 502 may, in various embodiments, determine if the data associated with the received address is present within a cache memory associated with the tag RAM 501 (commonly referred to as a "cache hit").

State control circuit 504 may read state information from state RAM 503 dependent upon the received address. In some embodiments, state control circuit 504 may access state RAM 503 in parallel with the access of tag RAM 501 by tag control circuit 502. In other embodiment, state control circuit 504 may be configured to simultaneously perform read and write accesses to state RAM 503.

Dependent upon the determination made by tag control circuit 502, state control circuit 504 may determine a new coherency state for the data associated with the received address. In some embodiments, state control circuit 502 may update the state information stored in state RAM 503 with the newly determined coherency state. State control circuit 502 may also generate a response indicating a hit or miss. The response may, in some embodiments, be sent to a current transaction table such as, e.g., CTT 303 as illustrated in FIG. 3.

Tag control circuit 502 may also include an input multiplex circuit. In some embodiments, the input multiplex circuit may be configured to select between multiple input sources. The input sources may include a current transaction table such as, e.g., CTT 303, an internal communication bus such as, e.g., internal bus 105 of SoC 100, or any other suitable input source.

It is noted that the duplicate tag unit illustrated in FIG. 5 is merely an example. In other embodiments, different numbers and configurations of tag and state RAMs are possible and contemplated.

Figure 6:
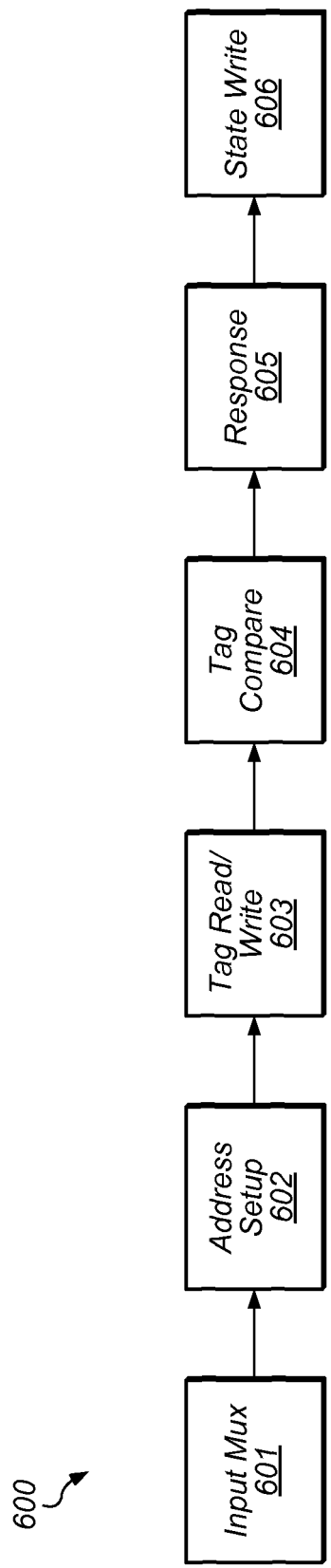
FIG. 6 illustrates a functional diagram of a duplicate tag unit pipeline.

The functional sub-blocks within a duplicate tag unit may be configured to operate in a pipeline fashion, i.e., the sub-blocks may be coupled together in a serial fashion with the output of one sub-block is coupled to the input of the next sub-block. Such a configuration allows the duplicate tag unit to process received tag addresses in a serial fashion, each sub-block performing its designated task and the sending the result to the next sub-block in the pipeline for further processing. A functional diagram depicting a pipeline configuration of a duplicate tag unit such as, e.g., duplicated tag unit 400, is illustrated in FIG. 6. In some embodiments, separate pipelines may be employed for each coherent agent whose cache memory is being monitored by the duplicate tag unit. Although depicted as separate sub-blocks in pipeline 600, the functions of each sub-block described herein may be performed by a single logic circuit such as, e.g., common tag control circuit 405 of duplicate tag unit 400 as illustrated in FIG. 4.

Input multiplex block 601 begins the pipeline. In some embodiments, input multiplex block 601 may be configured to select between multiple input sources. For example, input multiplex block 601 may be configured to select between requests from a CTT such as, e.g., CTT 303 as illustrated in FIG. 3, and requests received directly from an internal bus such as, e.g., internal bus 105 of SoC 100. In some embodiments, requests received over an internal bus may be requests to access configuration registers or setup functions within the duplicate tag unit.

The next stage of pipeline 600 is performed by address setup block 602. In some embodiments, address setup block 602 may format the received tag address to be used with each tag and state RAM included with the duplicate tag unit. For example, in some embodiments, only portions of the tag address may be used to access the tag and state RAMs.

The next operation of pipeline 600 is performed by tag read/write setup block 603. Tag read/write block 603 may, in various embodiments, be configured to access the tag and state RAMs included in the duplicate tag unit. In some embodiments, each tag and state RAM may be accessed simultaneously while, in other embodiments, one or more of the tag and state RAMs may be accessed in a serial fashion. Dependent upon the coherency request being processed, read accesses may be performed on each tag RAM. In some cases, new tag information may be stored in one or more of the tag RAMs, while read accesses are performed on the remaining tag RAMs.

The next stage of the pipeline 600 is performed by tag compare block 604. In some embodiments, tag compare block 604 may be configured to examine the results from read access to the tag RAMs included in the duplicate tag unit, and based on the examination, determine if data associated with the received tag address is stored within a cache memory of one of the coherency agents being monitored by the duplicate tag unit (commonly referred to as a "cache hit"). In some embodiments, tag compare block 604 may be further configured to check the parity of data retrieved from the tag RAMs. Each tag RAM may include one or more parity bits that may be stored with each entry in the tag RAM. Tag compare block 604 may use the store parity bits to determine if an error has occurred when the tag information was retrieved from the tag RAMs.

Response block 605 forms the next stage of pipeline 600. In various embodiments, response block 605 may be configured to generate a response indicating if the data associated with the received address is available in one of coherent agent's cache memories ("a cache hit") or the data is not available ("a cache miss"). The response may include information indicative of which coherent agent contains the requested data. Response block 605 may, in some embodiments, be configured to determine a new coherency state for data associated with the tag address. The new state may be calculated using state and tag information from other parallel versions of pipeline 600. In some embodiments, by processing state and tag information in parallel for each coherent agent up to this stage of the pipeline, replicated common circuitry may be employed for each version of the pipeline, thereby allowing the duplicate tag unit to easily be scaled for different numbers of coherent agents.

The final stage of pipeline 600 is performed by state write block 606. In some embodiments, state write block 606 may stored the previously determined new coherency state into the state RAMs. Since the state RAMs included in the duplicate tag unit may be configured to have separate read and write ports, a write of updated state information may be performed simultaneously with a read of state information such as may be performed by tag read/write block 603.

It is noted that the pipeline operation illustrated in FIG. 6 is merely an example. In other embodiments, different numbers and types of stages within the pipeline may be employed.

Figure 7:
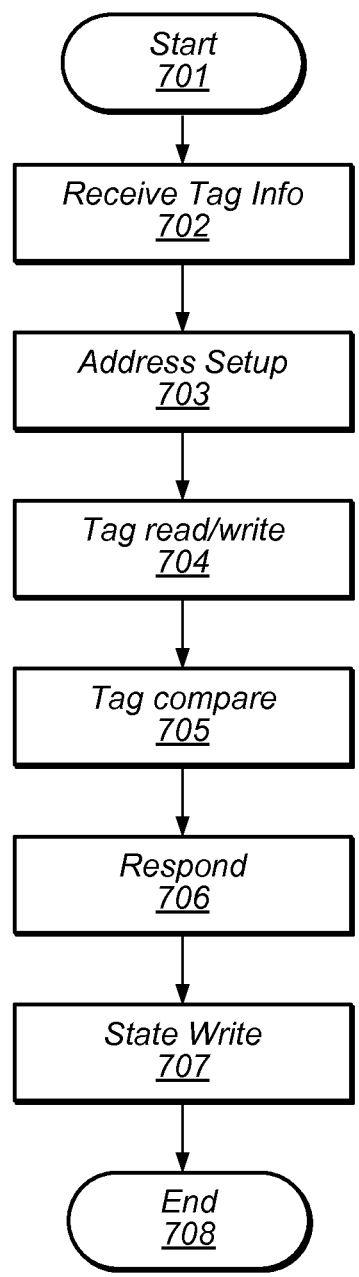
FIG. 7 illustrates a flowchart depicting an embodiment of a method for operating a duplicate tag unit.

Turning to FIG. 7, a flowchart depicting an embodiment of a method for operating a duplicate tag unit is illustrated. Referring collectively to duplicate tag unit 400 and the flowchart illustrated in FIG. 7, the method begins in block 701. Tag information may then be received (block 702). In some embodiments, the tag information may be received from a CTT such as, e.g., CTT 303, in response to a coherency operation. The tag information may, in various embodiments, include an address that points to data requested by a coherent agent within an SoC such as SoC 100, for example.

The received tag address may then be re-formatted or otherwise processed to be used to access the tag RAMs 401 through 404 and state RAMs 410 through 413 (block 703). In some embodiments, only a portion of the received tag address may be used to access the tag and state RAMs.

Once the addresses have been formatted and presented to the tag and state RAMs, the tag and state RAMs may then be accessed (block 704). In some embodiments, state information may be read from each of state RAMs 410 through 413, and tag information may be read from each of tag RAMs 401 through 404. In other embodiments, a write access may be performed to one of the tag RAMs 401 through 404 that may correspond to a coherent agent that issued the original request.

The accessed tag information may then be examined to determine if data associated with the received tag address is available in one of the coherent agents corresponding the tag RAMs 401 through 404 (block 705). In some embodiments, one or more parity bits may be stored along with each entry in tag RAMs 401 through 404. Prior to making the aforementioned determination, tag control circuits 406 through 409 may perform a parity check on the respective tag information received from tag RAMs 401 through 404.

Once the determination of a "cache hit" or "cache miss" has been made, a response may then be generated by the duplicate tag unit (block 706). The response may include information indicative of which coherent agent contains the requested data. In some embodiments, a new coherency state for data associated with the tag address may also be determined. The new state may be calculated by common state control circuit 414 using information from each of tag RAMs 401 through 404 and state RAMs 410 through 413.

The newly determined state may then be written into state RAMs 410 through 413 (block 707). In some embodiments, state RAMs 410 through 413 may each contain separate read and write ports, and the storage of the new state information may coincide with the reading of state information for a different tag address as described above in reference to block 704. Once the new state information has been stored in the state RAMs, the method may conclude (block 708).

Although the operations illustrated in FIG. 7 are depicted as being performed in a sequential manner, in other embodiments, one or more of the operations may be performed in parallel.

Numerous variations and modifications will become apparent to those skilled in the art once the above disclosure is fully appreciated. It is intended that the following claims be interpreted to embrace all such variation and modifications.

What is claimed is:

1. An apparatus, comprising:
a single-port memory configured to store tag information associated with a cache memory;
a dual-port memory configured to store state information associated with the cache memory;
a multiplex circuit configured to select one of a first request that includes a tag address, and a second request for access to one or more configuration registers; and
a control circuit coupled to the single-port memory and the dual-port memory, wherein the control circuit is configured to:
  access, in response to a selection of the first request, the stored tag information in the single-port memory dependent upon the received tag address;
  access, in response to a selection of the second request, the one or more configuration registers;
  read the stored state information from the dual-port memory dependent upon the received tag address;
  determine if data associated with the tag address is contained in the cache memory dependent upon the accessed stored tag information;
  update the read stored state information dependent upon the determination that the data associated with the tag address is contained in the cache memory;
  store the updated state information in the dual-port memory; and
  read additional stored state information from the dual-port memory in parallel with storing the updated state information.

2. The apparatus of claim 1, wherein to access the stored tag information in the single-port memory dependent upon the received tag address, the control circuit is further configured to store new tag information in the single-port memory dependent upon the received tag address.

3. The apparatus of claim 2, wherein the single-port memory is further configured to store one or more parity bits.

4. The apparatus of claim 1, wherein the single-port memory comprises a static random access memory (SRAM).

5. The apparatus of claim 1, wherein the dual-port memory comprises a static random access memory (SRAM).

6. The apparatus of claim 1, wherein to determine if data associated with the tag address is contained in the cache memory dependent upon the accessed stored tag information, the control circuit is further configured to send a response.

7. The apparatus of claim 1, wherein the single-port memory includes a parity bit associated with each entry in the single-port memory.

8. A method for operating a duplicate tag unit, comprising:
  selecting one of a first request and a second request, wherein the first request includes a tag address, and the second request includes a request for access to one or more configuration registers;
  accessing, in response to selecting the first request, one or more tag memories dependent upon the received tag address, wherein each tag memory of the one or more tag memories contains tag information for a respective one of one or more cache memories;
  accessing, in response to selecting the second request, the one or more configuration registers;
  reading state information from one or more state memories dependent upon the received tag address;
  determining if data associated with the received tag address is contained in the one or more cache memories;
  updating the state information read from the one or more state memories dependent upon the determination that the data associated with the received tag address is included in the one or more cache memories;
  storing the updated state information in the one or more state memories; and
  reading additional state information from the one or more state memories in parallel with storing the updated state information.

9. The method of claim 8, wherein receiving the request comprises selecting an input source from a plurality of input sources.

10. The method of claim 9, wherein the plurality of inputs sources comprises a configuration interface, and a current transaction table (CTT).

11. The method of claim 8, wherein accessing the one or more tag memories comprises retrieving previously stored tag information from at least one of the one or more tag memories.

12. The method of claim 8, wherein accessing the one or more tag memories comprises storing tag information into at least one of the one or more tag memories.

13. The method of claim 8, wherein each of the one or more tag memories comprises a single-port memory.

14. The method of claim 8, wherein each of the one or more state memories comprises a dual-port memory.

15. A system, comprising:
  a memory;
  a coherency unit coupled to the memory; and
  one or more processors coupled to the coherency unit, wherein each of the one or more processors includes a cache memory;
  wherein the coherency unit includes:
    one or more tag memories, wherein each one of the one or more tag memories is configured to store tag information for a respective cache memory of the one or more processors;
    one or more state memories, wherein each one of the one or more state memories is configured to store state information for a respective cache memory of the one or more processors;
    a multiplex circuit configured to select one of a first request or a second request, wherein the first request includes a tag address, and the second request includes a request to access one or more configuration registers;
    a control circuit configured to:
      access, in response to a selection of the first request, the tag information stored in the one or more tag memories dependent upon the received tag address;
      access, in response to a selection of the second request, the one or more configuration registers;
      read state information from the one or more state memories dependent upon the received tag address;
      determine if the received tag address is contained in the one or more cache memories;
      updating the state information read from the one or more state memories dependent upon the determination that the received tag address is included in the one or more cache memories;
      store the updated state information in the one or more state memories; and
      read additional state information from the one or more state memories in parallel with storing the updated state information.

16. The system of claim 15, wherein each tag memory of the one or more tag memories comprises a single-port memory.

17. The system of claim 15, wherein each state memory of the one of more state memories comprises a dual-port memory.

18. The system of claim 15, wherein to determine if the received tag address is contained in the one or more cache memories, the control circuit is further configured to check the parity of the accessed tag information.

19. The system of claim 15, wherein to determine if the received tag address is contained in the one or more cache memories, the control circuit is further configured to send a response to the received request.

* * * * *